April 18, 1933.    J. L. REUTTER    1,904,169
TORSION PENDULUM
Filed Nov. 4, 1927
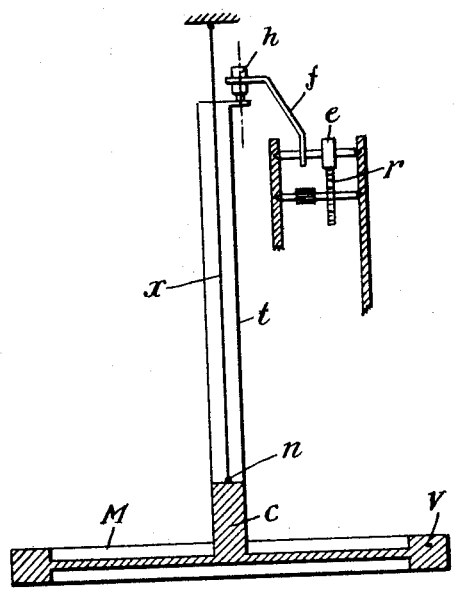
INVENTOR
Jean Leon Reutter
BY
ATTORNEY Patented Apr. 18, 1933

1,904,169

UNITED STATES PATENT OFFICE

JEAN LÉON REUTTER, OF PARIS, FRANCE

TORSION PENDULUM

Application filed November 4, 1927, Serial No. 231,042, and in France November 15, 1926.

My invention relates to a torsion pendulum and more particularly to a torsion pendulum to be used for time keeping.

A torsion pendulum generally comprises a flywheel, having a certain inertia, which is suspended by an elastic wire. This well known device, however, presents certain disadvantages, as for instance a great instability, because at the slightest touch or shock the pendulum undergoes a swinging movement in a plane, which is detrimental to the proper operation of the members causing the movement of the pendulum and thus may cause the same to be stopped. On the other hand, the amplitude of the usual pendulum is more or less restrained by the members through which it is impulsed, so that it is not sufficiently "free" to insure a perfect and regular movement.

The principal cause of such limitation of the movements or oscillations on the part of a pendulum by parts of the escapement, for example, is usually a matter of direct obstruction.

The torsion pendulum according to my invention is arranged so as to receive the impulses from the driving motor through a pin or the like rigidly connected to the flywheel and placed close to the point of suspension of the wire. The amplitude of said pin is thus equal to that of the flywheel itself. Due to this arrangement the pin is substantially always in the same position with relation to the escapement wheel, to receive the impulses, even if the clock does not stand plumb, or if the pendulum has undergone, owing to a shock or the like, a swinging movement aside from its rotary oscillation, inasmuch as the pendulum is wholly pendent upon and solely guided in rotary movement by the suspension wire. Moreover my pendulum is "free", i. e. is free of any obstruction or pivotal mounting or direct connection between the suspension wire and the pin through which said pendulum receives its driving impulses, and needs only to be in connection with the driving motor only at the very moment when it receives the impulse.

In the single figure of the accompanying drawing I have shown a constructional form of my invention. The flywheel V of the usual type has at the center thereof, a small cylindrical stem C and is suspended by an elastic wire $x$ attached to said stem C. A tube $t$ is fixed on the stem C and surrounds the wire $x$.

A cylindrical pin $h$ is mounted on the upper part of tube $t$ near the fixed support for the suspension wire $x$. Pin $h$ is rotatably mounted in order to decrease to a minimum the friction with the fork $f$ which transmits the impulses to the pendulum. The fork $f$ is actuated as usual by the escapement wheel $r$ through engagement with the anchor $e$ which is mounted on the same axis as the fork $f$.

It is clear that in view of this arrangement the oscillating movement of the pin $h$ has the same amplitude as that of the flywheel V, though placed near the fixed point of suspension of the same, realizing thus the advantages above set forth.

What I claim is:—

1. A suspended torsion pendulum including the combination, with a flywheel arranged for rotary oscillation about a substantially vertical axis and a suspension wire generally corresponding with said axis of a stem fixed at the center of said flywheel and to the top of which said wire is attached at a relatively great distance from the center of gravity of the flywheel, a tube rigidly secured to said stem and having an open and free upper end, and concentrically disposed about said suspension wire, an eccentrically disposed pin surmounting said tube, and drive means including a driven escapement having a fork associated therewith and arranged to make contact with said pin in order to oscillate said pendulum as a whole, said flywheel being solely supported and guided in movement by said suspension wire and said tube terminating short of the point of suspension of said wire with the upper open end thereof arranged independent of contact with the same.

2. A suspended torsion pendulum including the combination, with a flywheel, of a centrally disposed stem rigid upon said flywheel and projecting a distance therefrom in the direction of the axis thereof, a torsion spring attached to the end of said stem in the form of a wire disposed along said axis, whereby to pendently support and exclusively guide said flywheel in movement, a radially projecting arm rigidly carried upon said flywheel a distance above the level of the end of said stem, a pin secured upon said arm in a position parallel with and spaced from said wire, a cylindrical rotary member of relatively large diameter disposed upon said pin, said arm and associated pin being independent of said wire and the point of suspension thereof, drive means including an escapement, and a fork associated with said escapement in a position to make contact solely with said cylindrical rotary member and thereby impart impulses to said pin and provide an amplitude of more than one revolution for said flywheel and pin.

In testimony whereof I have affixed my signature.

JEAN LÉON REUTTER.